(12) United States Patent
Vassault

(10) Patent No.: US 9,321,125 B2
(45) Date of Patent: Apr. 26, 2016

(54) PARTS ASSEMBLED THROUGH FRICTION WELDING

(71) Applicant: SNECMA, Paris (FR)

(72) Inventor: Marc Jacky Vassault, Evry (FR)

(73) Assignee: SNECMA, Paris (FR)

( * ) Notice: Subject to any disclaimer, the term of this patent is extended or adjusted under 35 U.S.C. 154(b) by 321 days.

(21) Appl. No.: 13/935,883

(22) Filed: Jul. 5, 2013

(65) Prior Publication Data

US 2014/0016994 A1    Jan. 16, 2014

(30) Foreign Application Priority Data

Jul. 6, 2012    (FR) ...................................... 12 56517

(51) Int. Cl.
*B23K 20/12*    (2006.01)
*B23K 33/00*    (2006.01)

(52) U.S. Cl.
CPC .............. *B23K 20/12* (2013.01); *B23K 20/129* (2013.01); *B23K 33/006* (2013.01); *B23K 2201/06* (2013.01); *Y10T 403/477* (2015.01)

(58) Field of Classification Search
CPC .... B23K 20/129; B23K 20/12; B23K 33/006; B23K 2201/06
USPC ....................... 403/270; 228/114.5
See application file for complete search history.

(56) References Cited

U.S. PATENT DOCUMENTS

| | | | | |
|---|---|---|---|---|
| 3,268,248 A | * | 8/1966 | Chambers | 285/288.6 |
| 4,323,185 A | * | 4/1982 | Grilli et al. | 228/114 |
| 4,724,975 A | * | 2/1988 | Leventry | 220/581 |
| 4,813,806 A | * | 3/1989 | Minami et al. | 403/268 |
| 5,183,989 A | * | 2/1993 | Sanders et al. | 219/121.14 |
| 5,603,448 A | * | 2/1997 | Woerner et al. | 228/114.5 |
| 7,181,821 B2 | * | 2/2007 | Anderson et al. | 29/507 |
| 7,481,350 B1 | | 1/2009 | Shah | |
| 2011/0316271 A1 | * | 12/2011 | Lalam | 285/179 |
| 2012/0306199 A1 | * | 12/2012 | David | 285/333 |

FOREIGN PATENT DOCUMENTS

GB    1 361 435    7/1974
WO    WO 2012/047562 A2    4/2012

OTHER PUBLICATIONS

D. D Schober, "Reibschweissen von Metallen passage", Reibschweissen Von Metallen, DVS Verlag, Jan. 1, 1990, 8 pages.
French Preliminary Search Report issued Mar. 19, 2013, in French Application No. 12 56517 filed Jul. 6, 2012 (with English Translation of Categories of Cited Documents).

* cited by examiner

*Primary Examiner* — Joshua Kennedy
(74) *Attorney, Agent, or Firm* — Oblon, McClelland, Maier & Neustadt, L.L.P.

(57) ABSTRACT

A system includes a unit of a first part, and a proximal portion through an intermediate portion extended by a distal portion including a first extremity surface. A second part with a second portion includes a second surface to be friction welded with the extremity surface. A second portion is bordered laterally by a lateral surface and has a proximal portion, which extends through an intermediate portion extended by a distal portion. The distal portion of the second portion is carried in a malleable state during a friction welding. The intermediate portion of the second portion flares from the distal portion by the second towards and till the proximal portion of the second portion such that the bead of material from the deformation of the distal portion of the second portion during welding rubs against the lateral surface of the intermediate portion of the second portion during welding.

5 Claims, 3 Drawing Sheets

PARTS ASSEMBLED THROUGH FRICTION WELDING

BACKGROUND OF THE INVENTION

1. Field of the Invention

The present invention relates to one first part comprising of one first portion which extends along an axis X, the first part being laterally bordered by a lateral surface and presenting a proximal portion, which is extended by an intermediate portion which is extended by a distal tip, the extremity of which is one first surface, this first surface is meant to be welded/soldered by friction on one second surface of a second portion of a second part.

2. Description of the Related Art

The welding/soldering by friction is a procedure of welding which consists of assembling two parts by putting these two parts in movement in relation to one another and by supporting them against each other in such a way that one surface of the first part rubs on the surface of the second part. The rubbing of these surfaces against each other thus generates sufficient heat to heat the area of each part which is adjacent to the surfaces in contact which brings them to a malleable state.

These areas are thus capable to get deformed and solder together. After stopping the movement of one part relative to another, and the cooling of the two parts, these are thus soldered together.

During this welding, the regions adjacent to the contacting surfaces, which are in the malleable state, are deformed by discharging of the material at the extremities of the contact zone. This expelled material forms beads.

This is illustrated in FIGS. 4A and 4B, which represent the prior art.

A first part 1100 comprises of one first portion 1120 which is an excrescence of the first part 1100 and extending along an axis X. This first portion 1120 is bordered laterally by one lateral surface 1130 and presenting one a proximal portion 1122, which extends through intermediate portion 1124 that extends through a distal portion 1126. The extremity of this distal portion 1126 is one first surface 11136.

A second part 1200 includes one second portion 1220 which is an excrescence of the second part 1200 and which extends along an axis Y. This second portion 1220 is bordered laterally by one lateral surface 1230 and presents one proximal portion 1222, which extends through intermediate portion 1224 that extends through a distal portion 1226. The extremity of this distal portion 1226 is one second surface 1236.

In the welding procedure according to the prior art, one places in the first part 1100 in motion in relation to the second part 1200, and one approaches the first surface 1136 until they are in contact.

In the case illustrated in FIGS. 4A and 4B, the first portion 1100 is a tube axis of symmetry of which is the X axis, and the second portion 1120 is a tube of which the axis of symmetry is the Y axis, these two tubes are identical with the possible exception of their lengths according to the axis X and axis Y.

Considering the symmetry with respect to axes X and Y, only one half of parts is shown in longitudinal section.

The lateral surface 1130 of the first portion 1120 is thus comprised of a interior surface 1131 (which is a cylindrical surface of diameter equal to the interior diameter Di) and an external surface 1132 (which is a cylindrical surface of diameter equal to the diameter from the exterior De).

The lateral surface 1130 of the first portion 1220 is thus comprised of an interior surface 1231 (which is a cylindrical surface of diameter equal to the interior diameter Di) and an external surface 1232 (which is a cylindrical surface of diameter equal to the exterior diameter De).

The first lateral surface 1136 and the second surface 1236 are thus each an annular band with the inner diameter Di and the same exterior diameter De.

The first member 1100 is put into rotation around the X axis by means of a drive system (not shown). Once an angular speed of rotation is attained, the first part 1100 is separated from the drive system (the first part 1100 is thus in free rotation), then the first surface 1136 is put in contact and pressed against the second surface 1236 with a determined force, in such a way that these two surfaces overlap. The X axis and Y axis are merged. Likewise, the inner surface 1131 of the first portion 1120 on the inner surface 1231 of the second portion 1220 are aligned and form part of the same inner surface of a circular tube with a diameter Di. Similarly, the outer surface 1132 of first portion 1120 and the outer surface 1232 of the second portion are aligned and are part of the same surface of a circular tube diameter De.

The heat generated by the rubbing of the first surface 1136 and of the second surface 1236 makes the distal portion 1126 of the first part 1100 and the distal portion 1226 of the second part 1200 malleable which welds/solders by discharging the material at the extremities of their contact surface. This expelled material forms an interior bead 1310 on inner surface 1131 of first portion 1120 and inner surface 1231 of the second portion 1220, and an external 1320 on the outer surface 1132 of first portion 1120 and the inner surface 1232 of the second portion 1220.

4A shows the two parts (1100, 1200) just prior to contact.

4B shows the two parts (1100, 1200) after welding.

It is noted in FIG. 4B at the end of the welding process the flanges (1310, 1320) exceeds and are raised relative to the lateral surface 1130 of the first part 1100 and at the lateral surface 1230 of the second part 1200.

In practice, these (1310, 1320) should be further smoothened by machining.

One observes, for a lot of parts described here-above and theoretically identical, which are welded by friction according to the method described above, a significant dispersion in the volume of the beads (the dispersion is defined as the difference between the maximum value and the minimum value). This dispersion is due to the geometric tolerances of parts, tolerances in the properties of the materials constituting the parts, tolerances in the operating conditions of the welding process in general.

As a result, it is impossible to accurately predict the volume of the beads and it is therefore necessary to provide for each part a larger distal portion (1126, 1226), since the beads (1310, 1320) are formed by the deformation of the distal portions.

It results in an utilisation of a material in the development of parts (amount of material consumed during welding, called "material consumption") more than necessary, which is expensive and undesirable. In addition, the superfluous material (thickness superfluous of certain parts) must later be removed, resulting in additional costs.

BRIEF SUMMARY OF THE INVENTION

The present invention seeks to overcome these drawbacks.

The invention aims at providing one first part, meant to be welded by friction with a second part, which is such that the dispersion in the volume of beads formed is minimized.

This object is achieved by the fact that the distal portion is brought in the malleable state during the welding by friction, in that the intermediate portion flares from the distal portion towards and till the proximal portion so that the material resulting from the deformation of said distal portion during the said welding rubs against the lateral surface of the intermediate portion.

With these provisions, the excess metal, during its formation at the time of welding, rubs against the lateral surface of the intermediate portion of the first part, which was not the case for the first part of the prior art. This friction causes a significant slowing down of the rotation of the first part (compared to the prior art). This slowdown results in a decrease in the dispersion of the material consumption. In addition, the amount of material consumed, which forms the bead is generally much less.

Advantageously, the proximal portion of the first portion presents a cross-section more or less constant, so that this intermediate portion of the first portion forms a depression with respect to the proximal portion of the first portion.

Thus, the majority of the excess metal or its totality, comes, during its formation, housed in the depression (or cavity) formed by the intermediate portion. The excess metal thus does not exceed, or practically not above the lateral surface of the proximal portion of the first portion. As a result, the machining necessary to remove material that exceeds the lateral surface is minimized.

The invention also relates to an assembly comprising on the one hand consisting of a first part with a first portion which is a tube which extends along an axis X, the first portion being bordered laterally by a lateral surface and having a proximal portion, which is extended by an intermediate portion which is extended by a distal portion the extremity of which is one first surface, and on the other hand, of one second part with one second portion comprising of one second surface, the first surface and the second surface being adapted to be welded by friction.

According to the invention, the distal portion carried in a malleable state during the welding by friction, and the intermediate portion flares from the distal portion to the proximal portion so that the excess metal material resulting from the deformation of the distal portion during welding rubs against the lateral surface of the intermediate portion during welding, the first surface being an annular band, and a second portion extending along an axis Y, this second portion being bordered laterally by one lateral surface and presenting a proximal portion, which extends by an intermediate portion which is extended by a distal portion the extremity of which is the second surface, the distal portion of the second portion is brought to a malleable state during the welding by friction, in that the intermediate portion of the second portion flares from said distal portion towards and till the proximal portion of the second portion such that the bead of material resulting from deformation of the distal portion of the second part during the welding rubs against the lateral surface of the intermediate portion of the second portion during the welding.

The invention also relates to a procedure of friction welding between one first part and the second part.

According to the invention, the method comprises the following steps:

(a) One provides the first part comprising one first portion which is a tube which extends along an axis X, this first portion being bordered laterally by a lateral surface and presenting a proximal portion, which is extended by an intermediate portion which is extended by a the distal portion the extremity of which is one first surface, the intermediate portion flaring from the distal portion towards and till the proximal portion, the first surface being an annular band, (b) One provides one second part comprising one second portion which prevents one second surface, the second portion is extending along an Y axis, this said second part being laterally bordered by a lateral surface and presenting a proximal portion, which is extended by an intermediate portion which is extended by a distal portion the extremity of which is the second surface, which is an annular band, the intermediate portion of the second portion flares from said distal portion of the second part towards and till the proximal part of the second part.

(c) One puts the first part and the second part in relative movement one in relation to the other, (d) One applies the first part against the second part with one given force F in such a way that the first surface rubs against the second surface till it stops, the force F being sufficient for carrying the distal portion of the first portion and the distal portion of the second portion in a malleable state during this welding by friction, the beads of resulting material from the deformation of the distal portion of the first portion during the welding rubbing against the said lateral surface of the intermediate portion during the welding/soldering, and the beads of resulting material by the deformation of the portion of the distal portion of the second portion during the soldering/welding rubbing against the lateral surface of the intermediate portion of the second portion during the soldering/welding.

BRIEF DESCRIPTION OF THE SEVERAL VIEWS OF THE DRAWINGS

The invention will be better understood and its advantages will become more apparent from reading the following detailed description which follows given by way of non-limiting example. The description refers to the annexed drawings in which.

The FIG. 1A shows an assembly of two parts according to the invention which are welded by friction, before welding.

DETAILED DESCRIPTION OF THE INVENTION

Figure 1A:
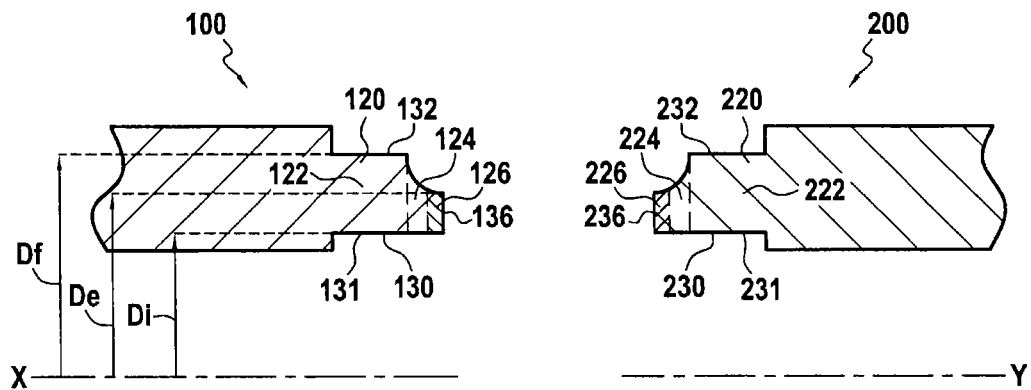
FIG. 1B is an assembly of two parts according to the invention which are welded by friction at the end of welding.
Figure 1B:
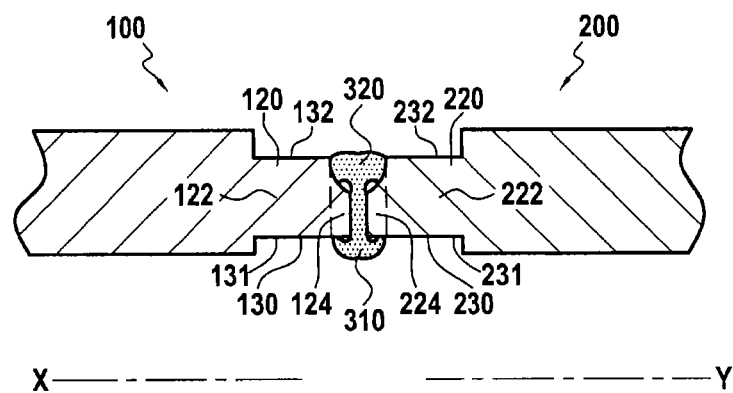

FIGS. 1A and 1B is a longitudinal section view of a set of two parts of the invention.

In the description below, the first portion 120 is an excrescence of the first part 100. The invention also applies to cases where the first portion 120 is any part of the first part 100.

One first part 100 includes a first portion 120 which is an excrescence of the first part 100 and which extends along an axis X. This first portion 120 is laterally bordered by a lateral surface 130 and has a proximal portion 122 (located closest to the junction between the first portion 120 and the rest of the first part 100), which is extended by an intermediate portion 124 which is extended by a distal portion 126. The extremity of the distal portion 126 is one first surface 136.

According to the invention, the intermediate portion 124 flares from the distal portion 126 towards and till the proximal portion 122.

Thus, the area of the cross section (in a plan perpendicular to the axis X) of the proximal portion 122 adjacent the intermediate portion 124 is greater than the area of the cross section of the distal portion 126.

One second part 200 comprises of a second portion 220 which is an excrescence of the second part 200 and which extends along an axis Y. This second portion 220 is bordered laterally by one lateral surface 230 and presents a proximal portion 222, which extends by one intermediate portion 224 which is extended by a distal portion 226. The extremity of this distal portion 226 is one second surface 236.

According to the invention, the intermediate portion 224 flares from the distal portion 226 towards and till the proximal portion 222

Thus, the area of the cross section (in a perpendicular plan to the axis Y) of the proximal portion 222 adjacent the intermediate portion 224 is greater than the area of the cross section of the distal portion 226.

In the case illustrated in FIGS. 1A and 1B, the first portion 120 is a tube the axis of symmetry of which is the X axis, and the second portion 220 is a tube the axis of symmetry of which is the Y axis, these two tubes are identical with the possible exception of their length along the axis X and axis Y.

Taking into consideration the symmetry with respect to axes X and Y, only one half of parts is shown in longitudinal section.

The side surface 130 of the first portion 120 comprises a inner surface 131 (which is a cylindrical surface of diameter equal to the inner diameter Di) and an outer surface 132 (which is a cylindrical surface of diameter equal to the outer diameter of the distal portion 126, and a toric surface on the concave intermediate portion 124 and a cylindrical surface of diameter Df strictly greater than the external diameter De of the proximal portion 122).

Figure 2A:
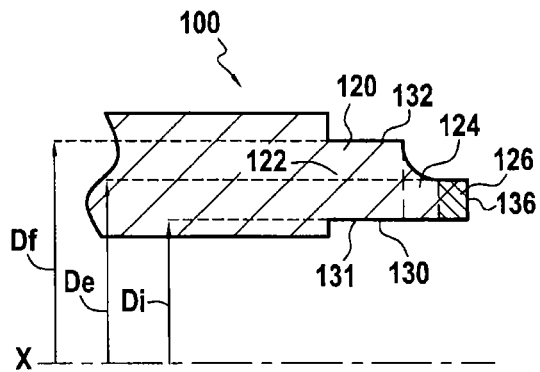
FIG. 2A shows one part according to the invention.

The geometry of the first portion 120 is also shown in FIG. 2A, which represents a first part 100 of the invention.

In the case illustrated in FIGS. 1A and 1B, the second portion 220 of the second part 200 has the same geometry as that of the first portion 120.

The lateral surface 230 of the second portion 220 comprises a inner surface 231 (which is one cylindrical surface of diameter equal to the inner diameter Di) and an outer surface 232 (which is a cylindrical surface of diameter equal to the outer diameter of the distal portion 226, and a toric surface on the concave intermediate portion 224 and a cylindrical surface of diameter Df strictly greater than the external diameter De of the proximal portion 222).

The first surface 136 and second surface 236 are each an annular band with the inner diameter Di and the same outside diameter De.

In the welding method according to the invention, the first part 100 is rotated around the X axis by means of a drive system (not shown). Once an angular speed of rotation is attained, the first part 100 is separated from the drive system (the first part 100 is free to rotate) and the first surface 136 is brought into contact and pressed against the second surface 236 with a predetermined force (force F), such that these two surfaces overlap. The X axis and Y axis are then merged. Thus, the inside surface 131 of first portion 120 and the inner surface 231 of the second portion 220 are aligned and are part of the same surface of a circular cylinder with a diameter Di.

The heat generated by the friction of these two surfaces makes the distal portion 126 of the first part 100 and the distal portion 226 of the second part 200 malleable which are welded by discharging the material at the extremities of their contact surface. A material is said to be in the state "malleable" when heated to a temperature high enough to irreversibly deform upon application of a stress.

This expelled material forms an inner bead 310 on the inside surface 131 of first portion 120 and the inner surface 231 of second portion 220, and forms an external bead 320 on the outer surface 132 of the first portion 120 and on the surface 232 of the second portion 220.

1A shows the two parts (100, 200) just prior to contact.

1B shows the two parts (100, 200) after welding.

According to the invention, the intermediate portion 124 of the first portion 120 and the intermediate portion 224 of the second portion 220 form a toric depression in which the exterior beads comes to lodge during its formation.

Figure 4A:
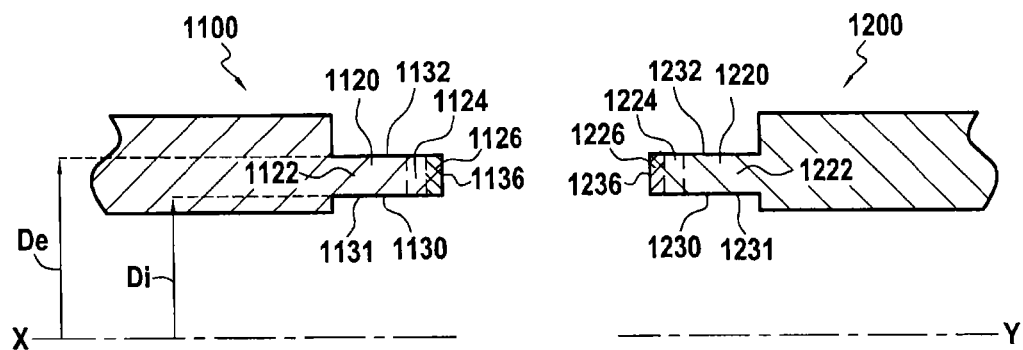
FIG. 4A shows two parts according to the prior art which are friction welded, before welding.
Figure 4B:
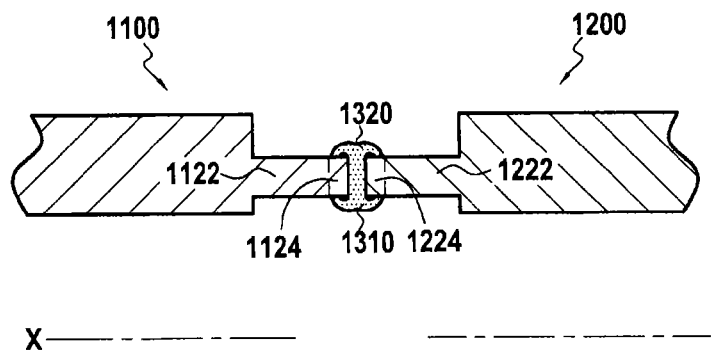
FIG. 4B shows the two parts according to prior art which are friction welded at the end of welding.

Accordingly, the exterior bead 320 rubs against the surface of the intermediate portion 124 of the first portion 120 and intermediate portion 224 of the second portion 220 during welding, and besides half of the exterior beads 320 of the beads arriving from the deformation of the distal portion 126 of the first part 100 rub against the half of the exterior beads 320 coming from the deformation of the distal portion 226 of the second part 200. These friction result in slower movement of the first part 100 relative to the second part 200 faster than in the case where the intermediate portions (124, 224) are in the straight extension of the distal portions (126, 226) and proximal portions (122, 222) (prior art, FIGS. 4A and 4B).

The amount of material required to obtain a welding of the two parts, that is to say the volume of the distal portions (126, 226) is thus minimized.

Figure 2B:
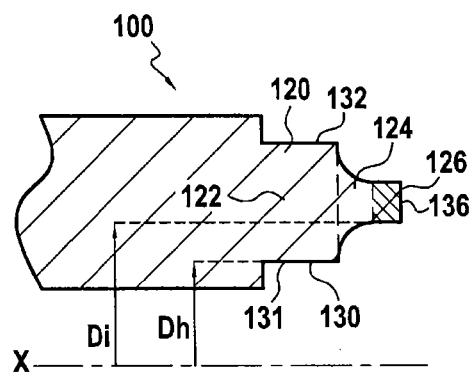
FIG. 2B shows another mode of realisation of a part according to the invention.
Figure 2C:
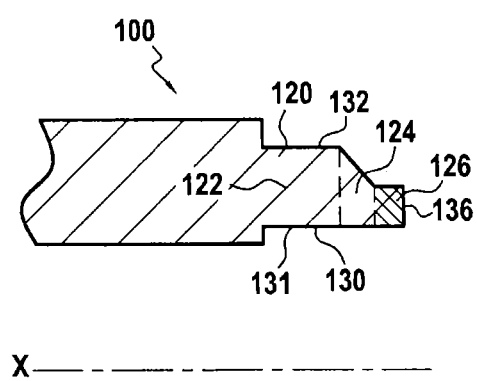
FIG. 2C shows yet another mode of realisation according to the invention.

The tests performed by the inventor on parts as illustrated in FIGS. 2A and 2C show that this slowdown saves the dispersion of the material in the order of 80% consumption (see Table 1 below).

In particular, this slowdown is more pronounced at the end of welding (just before stopping the movement of the first part 100) as the surface of the bead that rubs against the surfaces of the intermediate portions (124, 224) is much more that at the beginning of welding than start welding.

This dispersion has a standard deviation of 0.1 compared to a standard deviation of 0.4 to 0.8 according to the prior art in which the intermediate portions are in the linear extension of the distal portions (see Table 1 below).

TABLE 1

| Type of room | Dispersion | Standard deviation |
| --- | --- | --- |
| Prior art (FIG. 4A), diameter ≈ 50 mm | 2.17 | 0.82 |
| Prior art (FIG. 4A), ≈ 180 mm diameter | 1.37 (Average value) | 0.39 (Average value) |
| Prior art (FIG. 4A), ≈ 380 mm diameter | | |
| Invention (FIG. 2A), diameter ≈ 50 mm | 0.27 (Average value) | 0.1 (Average value) |
| Invention (FIG. 2C), diameter ≈ 50 mm | | |

In addition, the machining of the outer flange 320 so that its surface is in the linear extension of the proximal surfaces (122, 222) is minimized. This results in an increase in cost and manufacturing time.

After the welding process exceeds the inner bead 310, which is raised relative to the inner surface 131 of the first part 100 and the inner surface 231 of the second part 200 (FIG. 1B). Indeed, the interior surfaces do not show intermediate portion in which the inner bead 310 can be accommodated.

Advantageously, the inner surface 131 of the first portion 120 and the inner surface 231 of the second portion 220 are similar to that of the outer surfaces (132, 232) geometry, as shown in FIG. 2B to the first portion 120. Thus, the inner surface 131 is a cylindrical surface of diameter equal to the inner diameter Di of the distal portion 126, and a toric surface on the concave intermediate portion 124 and a cylindrical surface of diameter Dh strictly smaller than the inside diameter Di of the portion 122 proximally. The interior surface 231 of the second portion 220 has a shape identical to that of the inside surface 131 of first portion 120 geometry.

Thus, the intermediate portion 124 of the first part and the intermediate portion 224 of the second part 200 forms a depression in which is housed the inner bead 310 during its formation.

As a result, the inner bead 310 also rubs against the surface of the intermediate portion 124 of the first portion 120 and the intermediate portion 224 of the second portion 220 during welding. This has the advantage that the slowdown of the movement of the first part 100 relative to the second part 200 is even faster due to the friction of the inner bead 310, and that the inner bead 310 forms little or no relief with respect to the inner surface of the first portion via 124 and the second intermediate portion 224.

The invention relates to an assembly consisting of one first part 100 and second part 200 as described above.

In the mode of realisation described above, the intermediate portion 124 of the first portion 120 (and optionally the intermediate portion 224 of the second portion 220) has a toric surface, that is to say semi-circular, and concave. FIG. 2A illustrates, for the first portion 120, where only the outer surface 132 of the intermediate portion 124 is a toric concave surface. The inner surface 131 is cylindrical with a diameter Di. FIG. 2B illustrates, for the first portion 120, where the outer surface 132 and inner surface 131 of the intermediate portion 124 are each a concave toric surface.

Figure 2D:
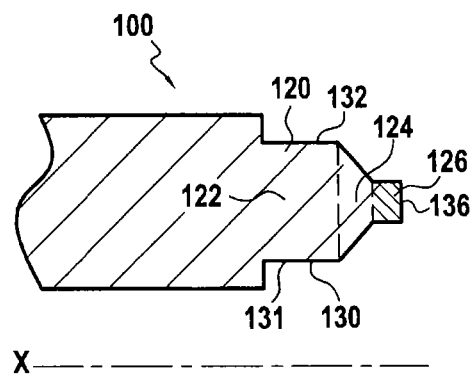
FIG. 2D shows another mode of realisation of a part according to the invention.

Alternatively, the intermediate portion 124 of the first portion 120 (and optionally the intermediate portion 224 of the second portion 220) is a conical surface, the generators of which are for example an angle of 45° with the axis X. FIG. 2C illustrates, for the first portion 120, where only the outer surface 132 of the intermediate portion 124 is flared surface. The inner surface 131 is cylindrical with a diameter Di. FIG. 2D shows, for the first part 120, if the outer surface 132 and the inner surface 131 of the intermediate portion 124 is a conical surface.

More generally, the intermediate portion 124 has a parabolic, or any profile (concave, convex, plane, or a combination thereof), and generally flares from the distal portion 126 towards and till the proximal portion 122. This also applies if required for the intermediate portion 224 of the second portion 220.

The geometry of the intermediate portion 124 of the first portion 120 and the geometry of the intermediate portion 224 of the second portion 220 may be identical.

Alternatively, these may be different geometries, in order to optimize the friction of the bead (310, 320) on the inner 131 and outer 132 surfaces of the inner intermediate portion 124 and on the inner 231 and outer 232 surfaces of the intermediate portion 224.

This can be especially true if the material of the first part 100 is different from the material of the second part 200.

In the mode of realisation above, the inner surfaces (131, 231) and outer surfaces (132, 232) of the proximal portions (122, 222) are tubes of circular section. The proximal portion 122 of the first portion 120 and proximal portion 222 of the second portion 220 thus each have a cross section (perpendicular to the axes X and Y) substantially constant. More generally, the proximal portions can be of varying thickness, and/or may not be the tubes.

In general, the proximal portion 122 of the first portion 120 has a substantially constant cross-section, so that the intermediate portion 124 of the first portion 120 forms a depression in relation to the proximal portion 122 of the first part 120.

Similarly, the proximal portion 222 of second portion 220 has a substantially constant cross-section, such that the intermediate portion 224 of the second portion 220 forms a depression with respect to the proximal portion 222 of the second portion 220.

This or these depressions thus form a groove or cavity.

In general, the invention also relates to an assembly comprising a first part 100 as described above, and a second part 200 as described above, but with dimensions (one or more diameter Df, L, D, Dh) different from the dimensions of the first part 100.

The invention also relates to a first part 100 as described above, and an assembly consisting of a first part 100 as described above and a second part 200 having no intermediate portion according to the invention.

Thus for example, according to another mode of realisation of the invention, the first part 100 is a part that extends along an X axis, and the second part 200 has a second surface 236 that is perpendicular to the X axis and extends beyond the first surface 136 when the X axis is placed at the geometric center of the second surface 236.

For example, according to another embodiment of the invention, the first part 100 is a part that extends along an X axis, and the second part 200 is circular or annular and extends along an axis Z perpendicular X-axis, the Z axis being the axis of symmetry.

Figure 3A:
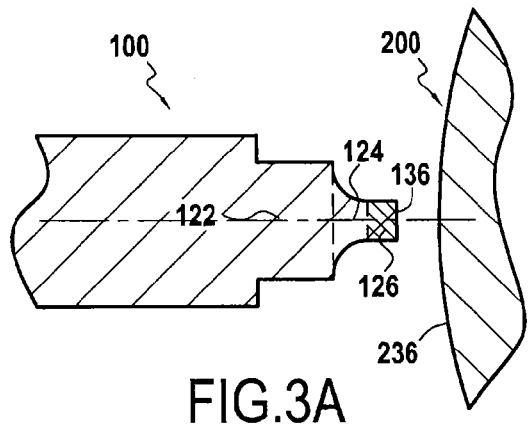
FIG. 3A shows a part of the invention which is friction welded to a ring, before welding.
Figure 3B:
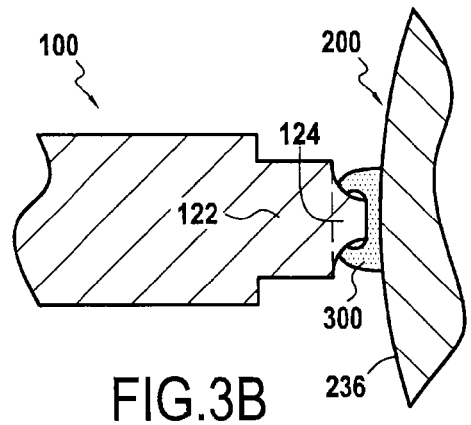
FIG. 3B represents one part according to the invention which is welded by friction on a ring after it's welding.

For example, the first part 100 is a blade, and the second part 200 is a ring or disk, as shown in FIGS. 3A and 3B.

The foot of the blade 100 is the first portion 120. The first surface 136 is the extremity 126 of the distal portion of the foot of the blade surface. The first surface 136 of the blade 100 may have any shape.

Positioning the blade such that the first surface 136 is opposite the outer surface (second surface) of the ring 236. Thus, the X axis (which extends from the head to the foot of the blade) is a radial axis of the ring, and is therefore perpendicular to the outer surface 236.

The ring 200 is brought into rotation around its own axis of symmetry axis Z with a drive mechanism (not shown), and then once a given rotational speed attained, approaching the blade 100 in such so that the first surface 136 rubs against the second surface 236 of the ring 200. FIG. 3A shows the dawn 100 and ring 200 before contact.

Rubbing the first surface 136 against the outer surface 236 renders the distal portion 126 malleable. Then the distal portion 126 forms a bead 130 which rubs against the intermediate portion 124 of which both lateral surfaces are concave and toric, as illustrated in FIG. 3A. Once the two parts are welded, it stops rotation of the ring.

3B illustrates the blade 100 and ring 200 after friction welding. The use of a blade 100 of the invention minimizes machining operations in the zone of junction between the blade 100 and the ring 200 for the bead 130 comes to lodge itself in the cavity formed by the lateral surfaces of the intermediate portion 124.

Advantageously one places on the circumference of a ring 200 a plurality of blades 100 each presenting a foot according to the invention, and welded by friction as described below.

The invention also applies to cases where the first portion 120 and second portion 220 are each a solid cylinder and not a tube.

The invention also relates to a method comprising the following steps:

(A) One provides one first part 100 comprising of one first portion 120 which extends along an axis X, the first portion 120 being laterally bordered by a lateral surface 130 and having a proximal portion 122, which extends through intermediate portion 124 which extends by a distal portion 126 by the extremity of which is one first surface 136, the intermediate portion 124 flaring from the distal portion 126 towards and till the proximal portion 122, (B) One provides one second part 200 comprising of one second portion 220 which prevents a second surface 236, (C) One puts the first part 100 and the second part 200 in relative motion in relation to each other, (D) One applies the first part 100 against the second part 200 F with a given force so that the first surface 136 rubs against the second surface 236 till it stops, the force F is sufficient to bring the distal portion 126 and the second surface 236 in the malleable state during the friction welding, the bead material 300 (which may comprise of two beads 310, 320) resulting from the deformation of the distal portion 126 during welding rubbing against the lateral surface of the intermediate portion 124 during welding.

The second portion 220 may have, in the above process, any form. FIGS. 3A and 3B illustrate an example of the use of such a method with a second portion which is the lateral outer layer of a ring or disc.

Advantageously, according to the invention, in step (b), the second portion 220 extends along an axis Y, the second portion 220 is laterally bordered by a lateral surface 230 and presenting a proximal portion 222, which is extended by an intermediate portion 224 that extends through a distal portion 226 whose distal end 236 is the second surface, and in that, in step (d), the distal portion 226 of the second portion 220 is brought to the malleable state during the friction welding, in that the intermediate portion 224 of the second portion 220 flares from the distal portion 226 of the second portion 220 to the proximal portion 222 of the second portion 220 so that the bead material 300 (which may comprise of two beads 310, 320) resulting from the deformation of the distal portion 226 of the second portion 220 during welding by friction rubbing against the lateral surface of the intermediate portion 224 of the second portion 220 during welding.

1A and 1B illustrate an example of using such a method.

The thickness of the intermediate portion 124 and proximal portion 122 of the first portion 120 of the first part 100 (FIGS. 2A to 2D) is obtained for example by adding material on intermediate and proximal portions of the first portion 120 of a part 1100 in the prior art. If necessary, the procedure is similar to the second portion 220 of the second part 200.

The realization of the first part 100 (and possibly the second part 200) is thus simplified.

The invention claimed is:

1. A friction welding method between a first part and a second part, said method comprising:
   (A) providing a first part comprising a first portion which is a tube which extends along an X axis, said first portion being bordered laterally by a first lateral surface and having a first proximal portion, that extends through a first intermediate portion which is extended by a first distal portion including a first extremity surface, said first intermediate portion flaring from said first distal portion towards and until said first proximal portion, said first extremity surface being an annular band;
   (B) providing a second part comprising a second portion having a second surface, said second portion extends along an Y axis, said second portion being bordered laterally by a second lateral surface and having a second proximal portion that extends through a second intermediate portion which is extended by a second distal portion including a second extremity surface which is an annular band, said second intermediate portion of the second portion flaring from said second distal portion of the second portion towards and until said second proximal portion of the second portion;
   (C) placing said first part and said second part in relative movement with respect to each other; and
   (D) applying said first part against said second part with a given strength F so that said first extremity surface rubs against said second extremity surface until said first part stops, said force F being sufficient to bring said first distal portion of the first portion and said second distal portion of the second portion in the malleable state during the friction welding, a bead of material resulting from deformation of said first distal portion of the first portion during said friction welding rubbing against said first lateral surface of the first intermediate portion during said friction welding, and resulting from deformation of said second distal portion of the second portion during said friction welding rubbing against said second lateral surface of the second intermediate portion of the second portion during said friction welding, and the friction resulting in slower movement of the first part relative to the second part, up to stopping the movement of the first part, and an inner bead of material forming little or no relief with respect to an inner surface of the first intermediate portion and the second intermediate portion.

2. The friction welding method as claimed in claim 1, wherein one or more intermediate portions and proximal portions are formed by addition of material on the first portion and the second portion.

3. The friction welding method as claimed in claim 1, wherein said second portion is a tube.

4. The friction welding method as claimed in claim 1, wherein the first intermediate portion of the first portion presents a tonic surface which is semi-circular and concave.

5. The friction welding method as claimed in claim 1, wherein the first intermediate portion of the first portion presents a conical surface.

\* \* \* \* \*